US012649644B2

(12) United States Patent
Lu et al.

(10) Patent No.: US 12,649,644 B2
(45) Date of Patent: Jun. 9, 2026

(54) MONORAIL HOIST TRANSPORTATION ROBOT DRIVEN BY PERMANENT MAGNET AND VARIABLE FREQUENCY OF EXPLOSION-PROOF LITHIUM BATTERY

(71) Applicant: China University of Mining and Technology, Jiangsu (CN)

(72) Inventors: Hao Lu, Jiangsu (CN); Zhencai Zhu, Jiangsu (CN); Wenqing Yang, Jiangsu (CN); Yuxing Peng, Jiangsu (CN); Yu Tang, Jiangsu (CN); Wei Wang, Jiangsu (CN); Huaxu Ma, Jiangsu (CN); Lijie Wang, Jiangsu (CN); Pengwei Yan, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 19/260,597

(22) Filed: Jul. 6, 2025

(65) Prior Publication Data

US 2026/0028205 A1 Jan. 29, 2026

(30) Foreign Application Priority Data

Jul. 23, 2024 (CN) ......................... 202410988977.2

(51) Int. Cl.

*B66C 13/48* (2006.01)
*B66C 11/06* (2006.01)
*B66C 13/16* (2006.01)
*B66C 13/22* (2006.01)
*B66C 19/00* (2006.01)

(52) U.S. Cl.

CPC .............. *B66C 13/48* (2013.01); *B66C 11/06* (2013.01); *B66C 13/16* (2013.01); *B66C 13/22* (2013.01); *B66C 19/00* (2013.01)

(58) Field of Classification Search

CPC ......... B66C 13/48; B66C 13/16; B66C 13/22; B66C 11/06; B66C 19/00; B66C 9/14
USPC ........................................................... 701/19
See application file for complete search history.

(56) References Cited

U.S. PATENT DOCUMENTS 9,410,331 B2 * 8/2016 King ....................... E04G 3/305
2002/0111711 A1 * 8/2002 Peshkin ................... B66D 3/20
700/230
2018/0208215 A1 * 7/2018 Zamorano Morfin .. B61B 1/005
2021/0017000 A1 * 1/2021 Sikora ...................... B66D 3/18

* cited by examiner

*Primary Examiner* — Andrew R Dyer
(74) *Attorney, Agent, or Firm* — JC ONE WORLD

(57) ABSTRACT

A monorail hoist transportation robot driven by permanent magnet and variable frequency of an explosion-proof lithium battery includes a state perception system and a cockpit, a lifting device, a power carriage and a plurality of driving units all suspended on the suspension track. Each driving unit includes a motor, and each motor has the operation modes including a constant power mode and a constant torque mode. The main controller is configured to obtain the travelling state of the monorail hoist transportation robot through the state perception system, and adjust the operation mode of the motor according to the travelling state.

10 Claims, 2 Drawing Sheets

MONORAIL HOIST TRANSPORTATION ROBOT DRIVEN BY PERMANENT MAGNET AND VARIABLE FREQUENCY OF EXPLOSION-PROOF LITHIUM BATTERY

CROSS-REFERENCE TO RELATED APPLICATIONS

The present application claims the priority to Chinese Patent Application No. 202410988977.2, filed with the Chinese Patent Office on Jul. 23, 2024 and entitled "a monorail hoist transportation robot driven by permanent magnet and variable frequency of an explosion-proof lithium battery", which is incorporated in its entirety herein by reference.

BACKGROUND

Technical Field

The present disclosure relates to the field of the coal mine transportation, and specifically relates to a monorail hoist transportation robot driven by permanent magnet and variable frequency of an explosion-proof lithium battery.

Description of Related Art

Under the requirements for vigorously building safe, high-yield and efficient modern mines, the modernization degree of the auxiliary transportation has become an important indicator to measure the modernization level of a coal mine. The characteristics of the auxiliary transportation system of coal mines are complex and variable transportation routes, multiple intermediate links, and different sizes of materials to be transported, which brings a significant inconvenience to the transportation in the tunnels.

As a novel type of the auxiliary transportation equipment, the monorail hoist has the advantages of not being affected by the floor conditions, convenient transportation roadway layout, space saving and high transportation efficiency, which has been valued by a plurality of the coal mine equipment manufacturers and coal mine manufacturers and has broad development prospects.

At present, the lithium battery monorail hoists have been widely utilized as a novel type of the auxiliary transportation equipment in the coal mines. However, since the lithium battery has a lower energy density and an insufficient power in comparison with the diesel engine, relative more driving units are utilized in the lithium battery monorail hoist and the locomotive is relative longer under a heavy load condition, so that a problem that the driving units are asynchronous exists under the situation where the operation condition is changed, such as climbing or descending. In addition, since the monorail hoist has the problem of the wheel-spin condition under different operation conditions, the drive wheel diameters of each drive units of the monorail hoist are different, which further increases the problem of asynchrony among the multiple driving units.

SUMMARY

In view of the above problems in the prior art, a monorail hoist transportation robot driven by permanent magnet and variable frequency of an explosion-proof lithium battery is provided in the present disclosure. The monorail hoist robot is moved by the suspension track, and includes a main controller, a state perception system and a cockpit, a lifting device and a plurality of driving units all suspended on the suspension track. The cockpit is configured to control the monorail hoist robot by a driver, and the lifting device is configured to load cargoes. Each driving unit includes a motor, and each motor has operation modes including a constant power mode and a constant torque mode.

The state perception system is configured to detect a travelling state of the monorail hoist transportation robot, and the operation mode of the motor is adjusted by the main controller through the travelling state obtained by the state perception system, specifically as follows.

When the state perception system detects that the monorail hoist transportation robot is in a stable travelling state, the constant power mode is maintained by the motor.

When the state perception system detects that the monorail hoist transportation robot is in an acceleration starting state, each motor is accelerated in the constant torque mode, when the motor is reached a rated power, the operation mode of the motor is converted into the constant power mode.

When the state perception system detects that parts of the driving units are began to climb a slope, the operation modes of the motors corresponding to the driving units not climbing the slope are converted into the constant torque mode, a resistance Fi increased by the driving units climbing the slope is evenly distributed to the each driving unit, the driving units not climbing the slope are decelerated, and a rotational speed of the corresponding motor after deceleration is Ni, wherein Ni is required to be calculated and obtained based on a stable travelling speed V of the monorail hoist transportation robot and a circumference Ci of a corresponding driving wheel, the stable travelling speed V of the monorail hoist transportation robot is calculated and obtained based on the resistance Fi, when all the driving units are reached the slope, the operation modes of the corresponding motors are converted to the constant power mode, when the state perception system detects that the cockpit in the monorail hoist transportation robot is driven out of the slope, the operation modes of the motors corresponding to the driving units passing through the slope are converted to the constant torque mode, and then a torque value corresponding to the constant torque mode is a value before climbing.

When the state perception system detects that parts of the driving units are began to descend the slope, the operation modes of the motors corresponding to the driving units descending a slope are converted to the constant torque mode, then a force Fj increased by the driving units descending the slope in a running direction is evenly distributed to each driving unit, when all the driving units are reached to the slope, the operation mode of the motor corresponding to each driving unit is converted into the constant power mode, when the state perception system detects that the cockpit in the monorail hoist transportation robot is driven away from the slope, the operation modes of the motors corresponding to the driving units not driven away the slope is converted into the constant torque mode.

Further, the state perception system includes a camera and a laser radar; the camera and the laser radar are capable of detecting obstacles in the suspension track, when the camera and the laser radar detect that an obstacle exists in front of the monorail hoist transportation robot, all the motors are decelerated by the driving units through reducing a magnitude and a voltage frequency of an input current of the motor, and the operation modes of the motors are converted into the constant torque mode, when the monorail hoist transportation robot is passed through the obstacle, the motors are accelerated through increasing the voltage frequency and the magnitude of the input current of the motor, and the operation modes of the motors are converted into the constant power mode after the motor is reached the rated power.

Further, the monorail hoist transportation robot further includes a power carriage suspended on the suspension track, the driving unit further includes a driving bracket, a clamping arm, a brake arm, a driving wheel, a brake cylinder, a brake shoe and a clamping cylinder, the driving wheel is driven by the motor, the motor is fixed on the clamping arm, and one end of the clamping arm is hinged on the driving bracket, and another end of the clamping arm is in connection with a clamping cylinder, the driving wheel is in close contact with the suspension track under an action of the clamping cylinder, the brake arm is hinged on the driving bracket, the brake shoe is fixed to one end of the brake arm and another end of the brake arm is in connection with the brake cylinder, the brake shoe is in close contact with the suspension track under a drive of the brake cylinder, and the brake cylinder, the clamping cylinder and the motor are all powered by the power carriage.

Further, the state perception system further includes a displacement sensor configured to detect a telescopic displacement of a piston rod in the clamping cylinder, and a method for calculating the circumference Ci of the driving wheel is as follows. Firstly, a compression amount of the driving wheel is calculated based on data sensed by the displacement sensor after the driving wheel is clamped, then, a radius of the corresponding driving wheel is calculated based on the compression amount of the driving wheel, and eventually an actual circumference Ci of the corresponding driving wheel is calculated.

Further, the state perception system further includes a load sensor, the load sensor is installed on the lifting device, abrasion data of the driving wheel are calculated according to the actual circumference Ci of the driving wheel, when a load of the monorail hoist transportation robot is lower than 40% of a set maximum load, the driving wheel whose abrasion data are reached a preset wear threshold is released by the clamping cylinder, and the corresponding driving unit is not operated.

Further, the state perception system further includes an inclination sensor, the inclination sensor is installed on a top of the cockpit and a top of each driving unit, the inclination sensor is configured to detect a slope inclination θ, and formulas for calculating Fi and Fj are:

$$Fi = m_1 g \sin\theta$$

$$Fj = m_2 g \sin\theta$$

where $m_1$ denotes a sum of weights of the driving units 4 climbing the slope and loads loaded by the corresponding driving units 4, $m_2$ denotes a sum of weights of the driving units 4 descending the slope and loads loaded by the corresponding driving units 4, and g denotes an acceleration of a gravity.

Further, a formula for calculating the stable travelling speed V of the monorail hoist transportation robot is:

$$V = P/(F + Fi)$$

where P denotes a rated power of the motor, F denotes a travelling resistance of the driving unit not climbing the slope.

Further, a formula for calculating the rotational speed Ni is:

$$Ni = V/Ci.$$

Further, the each motor is provided with an encoder and a driver, the encoder is configured to monitor the actual rotational speed of the motor in real time, the main controller is configured to compare the actual rotational speed of the motor with a set ideal rotational speed to calculate a rotational speed error, and a Pulse Width Modulation signal is given to a corresponding driver according to the rotational speed error, so that the rotational speed of the motor is adjusted by the motor in real time.

Further, the driving unit is provided with two sets of clamping arms, so that the driving wheels on the two sets of clamping arms are symmetrically arranged on both sides of the suspension track.

In the present disclosure, the circumference of the driving wheel of the monorail hoist transportation robot can be detected, the different rotational speed can be given to the motor, and the speed of each driving unit of the monorail hoist transportation robot can be adjusted according to the operation conditions such as the climbing and the descending to ensure the synchrony of each driving units and improve the service life of the monorail hoist transportation robot.

BRIEF DESCRIPTION OF THE DRAWINGS

In order to describe the embodiments of the present disclosure or the technical solutions in the prior art more clearly, the drawings required for use in the embodiments or the descriptions of the prior art will be briefly introduced below. Obviously, the drawings described below are merely some embodiments of the present disclosure, other drawings can be obtained by those of ordinary skilled in the art based on these drawings without paying creative efforts.

Figure 1:
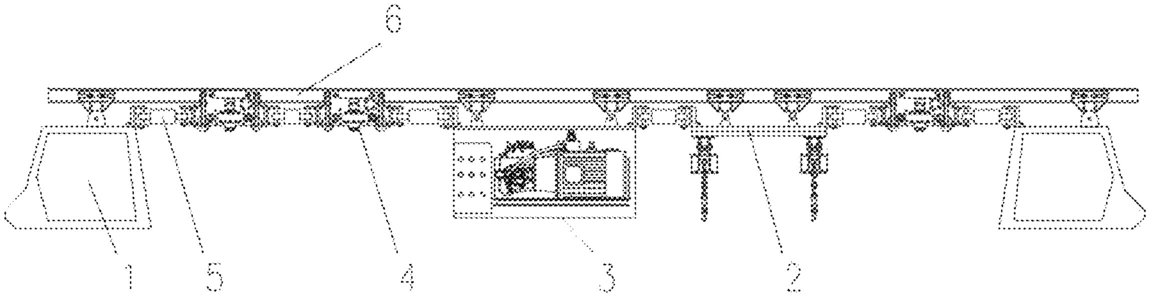
FIG. 1 illustrates an overall schematic diagram of a monorail hoist transportation robot driven by permanent magnet and variable frequency of an explosion-proof lithium battery of the present disclosure.

In the drawings: 1. cockpit; 2. Lifting device; 3. Power carriage; 4. Driving unit; 41. Driving bracket; 42. Clamping arm; 43. Brake arm; 44. Motor; 45. Driving wheel; 46. Brake cylinder; 47. Brake shoe; 48. Clamping cylinder; 5. Connecting rod; 6. Suspension track.

DESCRIPTION OF THE EMBODIMENTS

The technical solutions of the embodiments of the present disclosure will be described clearly and completely with reference to the accompanying drawings of the embodiments of the present disclosure. Obviously, the described embodiments are merely one part of the embodiments of the present disclosure, rather than all of the of embodiments.

Based on the embodiments of the present disclosure, all other embodiments obtained by those of ordinary skilled in the field without creative work are within the scope of protection of the present disclosure.

As illustrated in FIG. 1, a monorail hoist robot driven by the permanent magnet and variable frequency of the explosion-proof lithium battery is moved through a suspension track 6.

The monorail hoist robot driven by the permanent magnet and variable frequency of the explosion-proof lithium battery includes a state perception system and a cockpit 1, a lifting device 2, a power carriage 3 and a plurality of driving units 4 connected by a connecting rod 5 and suspended on the suspension track 6. The cockpit 1 can be arranged at both ends of the monorail hoist transportation robot, so as to facilitate to drive. Each driving unit 4 includes a motor 44, and each motor 44 has the operation modes including a constant power mode and a constant torque mode.

Figure 2:
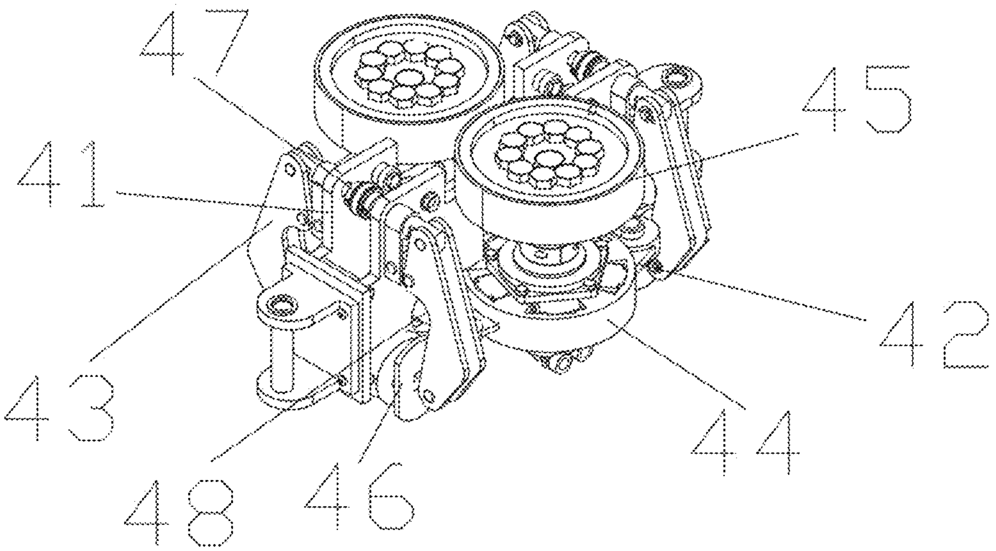
FIG. 2 illustrates a schematic diagram of a driving unit in the present disclosure.

As illustrated in FIG. 2, the driving unit 4 includes a driving bracket 41, a clamping arm 42, a brake arm 43, a motor 44, a driving wheel 45, a brake cylinder 46, a brake shoe 47 and a clamping cylinder 48. The driving bracket 41 is taken as a base, and each component is installed on the driving bracket 41. The driving wheel 45 is driven by the motor 44, and a permanent magnet synchronous motor is adopted by the motor 44. The motor 44 is fixed on the clamping arm 42, one end of the clamping arm 42 is hinged on the driving bracket 41, and the other end of the clamping arm 42 is in connection with the clamping cylinder 48. The driving wheel 45 is in close contact with the suspension track 6 under the action of the clamping cylinder 48, so that the monorail hoist transportation robot driven by the driving wheel 45 is moved along the suspension track 6. The brake arm 43 is hinged on the driving bracket 41, and the brake shoe 47 is fixed on one end of the braking arm 43, and the other end of the braking arm 43 is in connection with the brake cylinder 46. The brake shoe 47 can be in close contact with the suspension track 6 under the drive of the brake cylinder 46, and is configured to brake the driving unit 4.

In this embodiment, preferably, the driving unit 4 is provided with two sets of clamping arms 42, so that the driving wheels 45 on the two sets of clamping arms 42 are symmetrically arranged on both sides of the suspension track 6 to drive stably. Further, the brake cylinder 46 is a bidirectional cylinder, and both ends of the brake cylinder 46 are respectively in connection with a brake arm 43, so that the brake shoes 47 in connection with the two brake arms 43 are symmetrically arranged on both sides of the suspension track 6 to brake stably. Further, two sets of brake cylinders 46 are provided, and the brake shoes 47 corresponding to the two sets of braking cylinders 46 are arranged on both sides of the driving wheel 45 to further brake stably.

The brake cylinder 46, the clamping cylinder 48 and the motor 44 are powered by the power carriage 3. The power carriage 3 includes an explosion-proof lithium battery, a flameproof motor, a hydraulic pump and other components. The flameproof motor and the hydraulic pump are configured to supply the power for the brake cylinder 46 and the clamping cylinder 48 of each driving unit 4, and the explosion-proof lithium battery is configured to supply the power for the motor 44 of each driving unit 4 and the whole monorail hoist transportation robot.

Figure 3:
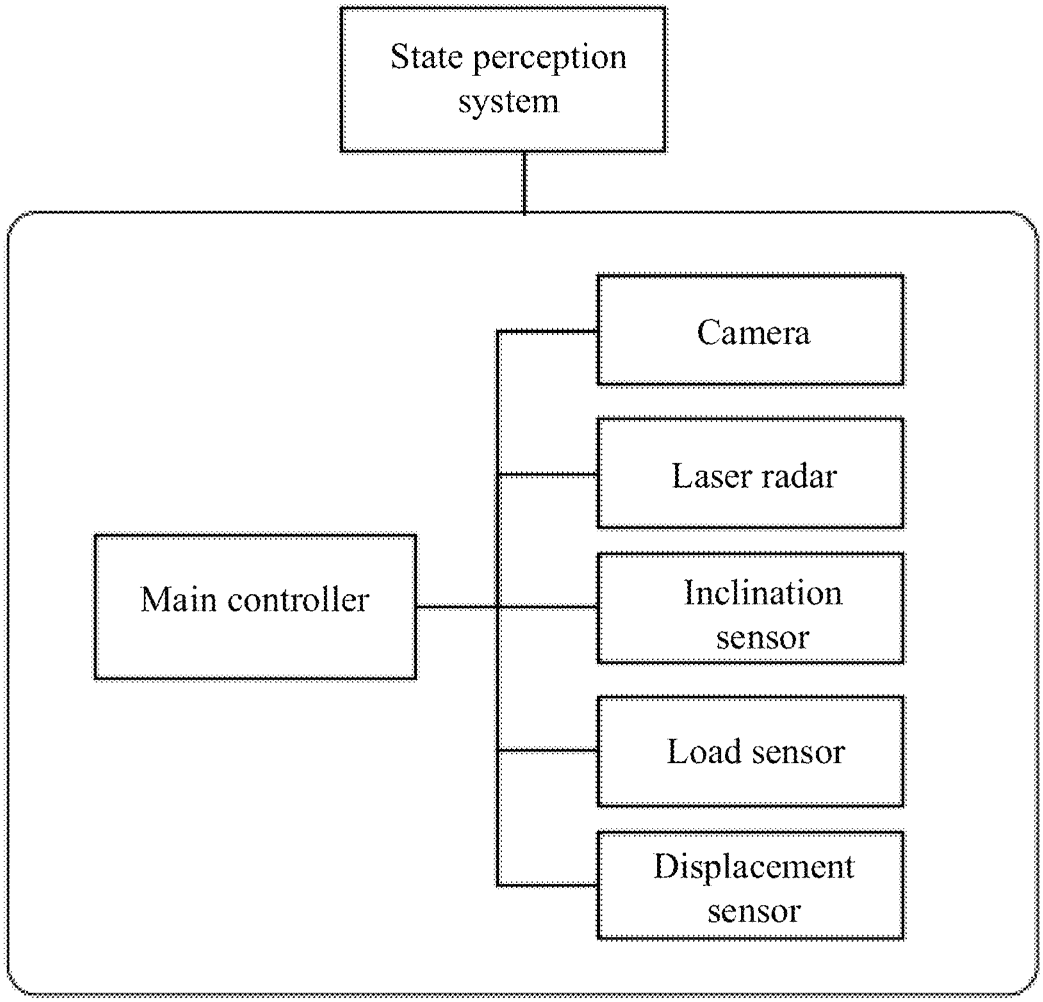
FIG. 3 illustrates a schematic diagram of a state perception system in the present disclosure.

As illustrated in FIG. 3, the state perception system includes a camera, a laser radar, an inclination sensor, a load sensor and a main controller. The obstacles can be detected by the camera and the laser radar in the suspension track 6, and preferably, the camera and the laser radar are installed at the front of the cockpit 1. An infrared camera is preferably adopted by the camera, and the laser radar is preferably two, which are installed on both sides of the cockpit 1. The inclination sensor is installed on the top of the cockpit 1 and the top of each driving unit 4, and is configured to detect the inclination of the cockpit 1 and the driving unit 4, that is, the slope inclination angle, so as to facilitate to determine the travelling state of the locomotive, and the load sensor is installed on the lifting device 2, and is configured to detect the load at the lifting device 2.

The main controller is configured to obtain the travelling state of the monorail hoist transportation robot through the information obtained by the state perception system, and adjust the control strategy of the motor 44 according to the travelling state of the monorail hoist transportation robot, which includes as follows.

Operation Condition at Flat Ground

When the state perception system detects that the monorail hoist transportation robot is in a stable travelling state, the constant power mode is maintained by the motor 44.

When the state perception system detects that the monorail hoist transportation robot is in the acceleration starting state, the motor 44 is accelerated in the constant torque mode, and when the power of the motor 44 is reached the rated power, the operation mode of the motor 44 is converted into the constant power mode.

Operation Condition when Climbing

When the state perception system detects that parts of the driving units 4 are began to climb a slope, and parts of the driving units are not began to climb, the main controller is configured to send an instruction to reduce the output torque of the motor 44 of the driving unit 4 not climbing the slope, and convert the operation mode into the constant torque mode, and the motors 44 corresponding to the driving units 4 that are began to climb remain in the constant power mode for climbing.

The resistance Fi increased by the driving units 4 climbing the slope is evenly distributed to each driving unit 4, and the different rotational speed Ni of the driving units 4 not climbing the slope is obtained and calculated based on the stable travelling speed V and the circumference Ci of the driving wheel 45 and the speed is decelerated immediately. The stable travelling speed V is the speed at which the driving unit 4 climbing the slope is finally travelled stably on the suspension track 6 in the constant power mode. When all the driving units 4 are reached the slope, the operation modes of all the driving units 4 are converted into the constant power mode, when the monorail hoist transportation robot detects that the cockpit 1 is driven out of the slope, that is, the headstock is driven out of the slope, and at this instant, the rear driving units 4 are still climbing, the torque of the driving unit 4 passing through the slope is immediately reduced to a value before climbing and the operation mode is converted into the constant torque mode. After all the driving units 4 are passed through the slope, the operation modes of the motors 44 in all driving units 4 are converted into the constant power mode for acceleration, where $Fi=m_1 g \sin\theta$, $m_1$ denotes a sum of the weights of the driving unit 4 climbing the slope and the loads loaded by the corresponding driving units 4, g denotes an acceleration of the gravity, and θ denotes the inclination angle of the slope.

Operation Condition when Descending

When the state perception system detects that parts of the driving units 4 are began to descend the slope and parts of the driving units 4 are not began to descend the slope, the main controller is configured to send an instruction to reduce the output torque of the driving units 4 descending the slope and convert the operation mode into the constant torque mode, and the driving units 4 not descending the slope remain in the constant power mode.

The force Fj increased by the driving units 4 descending the slope in the travelling direction is evenly distributed to each driving unit 4. The output force of the driving unit 4 descending the slope is reduced to keep the whole locomotive travelling at the same speed. When all the driving units 4 are reached the slope, the operation modes of all the driving units 4 are converted into the constant power mode. When the monorail hoist transportation robot detects that the cockpit 1 is driven out of the slope, and the rear driving unit 4 is still descending at this time, the output force of the driving unit 4 not driven out of the slope is reduced, and the operation mode is converted into the constant torque mode. After all the driving units 4 are reached the flat ground, all the operation modes of the driving units 4 are converted into the constant power mode, where $Fi=m_2g \sin \theta$, $m_2$ denotes the sum of the weights of the driving unit 4 descending the slope and the loads loaded by the corresponding driving units 4.

Operation Condition in the Case where an Obstacle Exists

When the state perception system detects that an obstacle exists ahead, and a deceleration is required to be performed, the magnitude and the voltage frequency of the current output to the motor 44 are reduced by all the driving units of the monorail hoist transportation robot, and the operation mode is converted into the constant torque mode. After the monorail hoist transportation robot is passed through the obstacle, the voltage frequency and the magnitude of the current input to the motor 44 are increased for acceleration. After the monorail hoist transportation robot is reached the rated power, the operation mode is converted into the constant power mode.

The state perception system of this embodiment further includes a displacement sensor, the displacement sensor is installed on the clamping cylinder 48. For example, a magnetostrictive displacement sensor is adopted, which is installed on the piston rod inside the clamping cylinder 48 of the driving unit 4 to monitor the displacement of the clamping cylinder 48 during operation. The compression amount of the driving wheel 45 is calculated according to the data of the displacement sensor after the driving wheel 45 is clamped, that is, the variation in the displacement of the clamping cylinder 48, to determine the radius of the driving wheel 45, so that the circumference Ci of the driving wheel 45 is calculated, or the circumference Ci of the driving wheel 45 is queried according to a pre-set database. The rotational speed of each driving wheel 45 is calculated according to the circumference of each driving wheel 45, and the stable travelling speed V of the monorail hoist transportation robot is set, then the set rotational speed of each driving wheel 45 is obtained according to $Ni=V/Ci$, where Ni denotes the set rotational speed for each driving wheel 45 that keeps each driving unit 4 of the monorail hoist transportation robot synchronously running, Ci denotes the circumference of each driving wheel 45. Preferably, $V=P/(F+Fi)$, P denotes the rated power of the motor 44, and F denotes the travelling resistance of the driving unit 4 not climbing the slope.

In this embodiment, the abrasion data of the driving wheel 45 is calculated based on the actual circumference Ci of the driving wheel 45, and the abrasion data of the driving wheel 45 can be determined based on the difference between the circumference of the current driving wheel and the circumference of the original driving wheel. When the load of the monorail hoist transportation robot is lower than 40% of the maximum load, the driving wheel 45 whose abrasion is reached the preset wear threshold is released by the clamping cylinder 48, and the corresponding driving units 4 are not operated to prevent further abrade of the driving wheel 45 that has already been severely worn.

Figure 4:
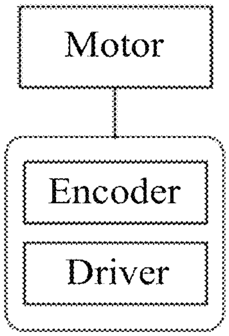
FIG. 4 illustrates a schematic diagram of a motor of a driving unit in the present disclosure.

As illustrated in FIG. 4, in this embodiment, preferably, an encoder is arranged on each motor 44 of the driving unit 4, and the encoder is configured to monitor the parameters of the motor 44 in real time and feed back to the main controller, which can effectively reduce the following error of the motor 44. A driver is arranged on each motor 44, and a signal given by the main controller is compared with the main controller based on the feedback information of the encoder, and a Pulse Width Modulation signal is given to the driver according to the error between the actual rotational speed and the ideal rotational speed, so that the rotational speed of the motor 44 can be adjusted in real time.

Obviously, those skilled in the art can make various changes and modifications to the present disclosure without departing from the spirit and scope of the present disclosure. Thus, if these modifications and variations of the present disclosure fall within the scope of the claims of the present disclosure and their equivalents, the present disclosure is also intended to include these modifications and variations.

What is claimed is:

1. A monorail hoist transportation robot driven by permanent magnet and variable frequency of an explosion-proof lithium battery, wherein the robot is moved by a suspension track, the robot comprises a main controller, a state perception system, and a cockpit, a lifting device and a plurality of driving units all suspended on the suspension track, the cockpit is configured to control the monorail hoist transportation robot by a driver, and the lifting device is configured to load cargoes, each driving unit includes a motor, and each motor has operation modes including a constant power mode and a constant torque mode;

the state perception system detects a travelling state of the monorail hoist transportation robot, and the operation mode of the motor is adjusted by the main controller through the travelling state detected by the state perception system, wherein:

when the state perception system detects that the monorail hoist transportation robot is in a stable travelling state, the constant power mode is maintained by the motor;

when the state perception system detects that the monorail hoist transportation robot is in an acceleration starting state, each motor is accelerated in the constant torque mode and when the motor reaches a rated power, the operation mode of the motor is converted into the constant power mode;

when the state perception system detects that parts of the driving units begin to climb a slope, the operation modes of the motors corresponding to the driving units not climbing the slope are operated using the constant torque mode, a resistance Fi increased by the driving units climbing the slope is evenly distributed to the each driving unit, the driving units not climbing the slope are decelerated, and a rotational speed of the corresponding motor after deceleration is Ni, wherein Ni is required to be calculated and obtained based on a stable travelling speed V of the monorail hoist transportation robot and a circumference Ci of a corresponding driving wheel, the stable travelling speed V of the monorail hoist transportation robot is calculated and obtained based on the resistance Fi;

when all the driving units have reached the slope, the operation modes of the corresponding motors are operated using the constant power mode, when the state perception system detects that the cockpit in the monorail hoist transportation robot is leaving the slope, the operation modes of the motors corresponding to the driving units passing through the slope are operated using the constant torque mode, and then a torque value corresponding to the constant torque mode is a value before climbing;

when the state perception system detects that parts of the driving units begin to descend the slope, the operation modes of the motors corresponding to the driving units descending the slope are operated using the constant torque mode, then a force Fj increased by the driving units descending the slope in a running direction is evenly distributed to each driving unit;

when all the driving units have reached to the slope, the operation mode of the motor corresponding to each driving unit is converted into the constant power mode, when the state perception system detects that the cockpit in the monorail hoist transportation robot has left the slope, the operation modes of the motors corresponding to the driving units that have not left the slope is converted into the constant torque mode.

2. The monorail hoist transportation robot driven by the permanent magnet and variable frequency of the explosion-proof lithium battery according to claim 1, wherein the state perception system includes a camera and a laser radar;

the camera and the laser radar are capable of detecting obstacles in the suspension track, when the camera and the laser radar detect that an obstacle exists in front of the monorail hoist transportation robot, all the motors are decelerated by the driving units through by reducing a magnitude and a voltage frequency of an input current of the motor, and the operation modes of the motors are operated using the constant torque modes;

when the monorail hoist transportation robot has passed the obstacle, the motors are accelerated by increasing the voltage frequency and the magnitude of the input current of the motor, and the operation modes of the motors are operated using the constant power mode after the motor has reached the rated power.

3. The monorail hoist transportation robot driven by the permanent magnet and variable frequency of the explosion-proof lithium battery according to claim 1, wherein the monorail hoist transportation robot further includes a power carriage suspended on the suspension track, the driving unit further includes a driving bracket, a clamping arm, a brake arm, a driving wheel, a brake cylinder, a brake shoe, and a clamping cylinder;

the driving wheel is driven by the motor;

the motor is fixed on the clamping arm;

one end of the clamping arm is hinged on the driving bracket, and another end of the clamping arm is in connection with a clamping cylinder;

the driving wheel is in contact with the suspension track under an action of the clamping cylinder;

the brake arm is hinged on the driving bracket;

the brake shoe is fixed to one end of the brake arm and another end of the brake arm is in connection with the brake cylinder;

the brake shoe is in contact with the suspension track under a drive of the brake cylinder; and the brake cylinder, the clamping cylinder and the motor are all powered by the power carriage.

4. The monorail hoist transportation robot driven by the permanent magnet and variable frequency of the explosion-proof lithium battery according to claim 3, wherein the state perception system further includes a displacement sensor configured to detect a telescopic displacement of a piston rod in the clamping cylinder; and a method for calculating the circumference Ci of the driving wheel comprising calculating a compression amount of the driving wheel based on data sensed by the displacement sensor after the driving wheel is clamped and calculating a radius of the corresponding driving wheel based on the compression amount of the driving wheel until an actual circumference Ci of the corresponding driving wheel is calculated.

5. The monorail hoist transportation robot driven by the permanent magnet and variable frequency of the explosion-proof lithium battery according to claim 4, wherein the state perception system further includes a load sensor, the load sensor is installed on the lifting device;

abrasion data of the driving wheel are calculated according to the actual circumference Ci of the driving wheel, and when a load of the monorail hoist transportation robot is lower than 40% of a set maximum load, the driving wheel whose abrasion data has reached a preset wear threshold is released by the clamping cylinder, and the corresponding driving unit is not operated.

6. The monorail hoist transportation robot driven by the permanent magnet and variable frequency of the explosion-proof lithium battery according to claim 5, wherein the state perception system further includes an inclination sensor, the inclination sensor is installed on a top of the cockpit and a top of each driving unit, the inclination sensor is configured to detect a slope inclination θ, and formulas for calculating Fi and Fj are:

$$Fi = m_1 g \sin\theta$$

$$Fj = m_2 g \sin\theta$$

where $m_1$ denotes a sum of weights of the driving units climbing the slope and loads loaded by the corresponding driving units, $m_2$ denotes a sum of weights of the driving units descending the slope and loads loaded by the corresponding driving units, and g denotes an acceleration of a gravity.

7. The monorail hoist transportation robot driven by the permanent magnet and variable frequency of the explosion-proof lithium battery according to claim 6, wherein a formula for calculating the stable travelling speed V of the monorail hoist transportation robot is:

$$V = P/(F + Fi)$$

where P denotes a rated power of the motor, F denotes a travelling resistance of the driving unit not descending the slope.

8. The monorail hoist transportation robot driven by the permanent magnet and variable frequency of the explosion-proof lithium battery according to claim 3, wherein the driving unit is provided with two sets of clamping arms, so that the driving wheels on the two sets of clamping arms are symmetrically arranged on both sides of the suspension track.

9. The monorail hoist transportation robot driven by the permanent magnet and variable frequency of the explosion-proof lithium battery according to claim 1, wherein a formula for calculating the rotational speed Ni is:

$$Ni = V/C.$$

10. The monorail hoist transportation robot driven by the permanent magnet and variable frequency of the explosion-proof lithium battery according to claim 1, wherein the each motor is provided with an encoder and a driver, the encoder is configured to monitor an actual rotational speed of the motor in real time;

the main controller is configured to compare the actual rotational speed of the motor with a set ideal rotational speed to calculate a rotational speed error; and a Pulse Width Modulation signal is given to a corresponding driver according to the rotational speed error, so that the rotational speed of the motor is adjusted by the motor in real time.

* * * * *